Patented Jan. 11, 1944

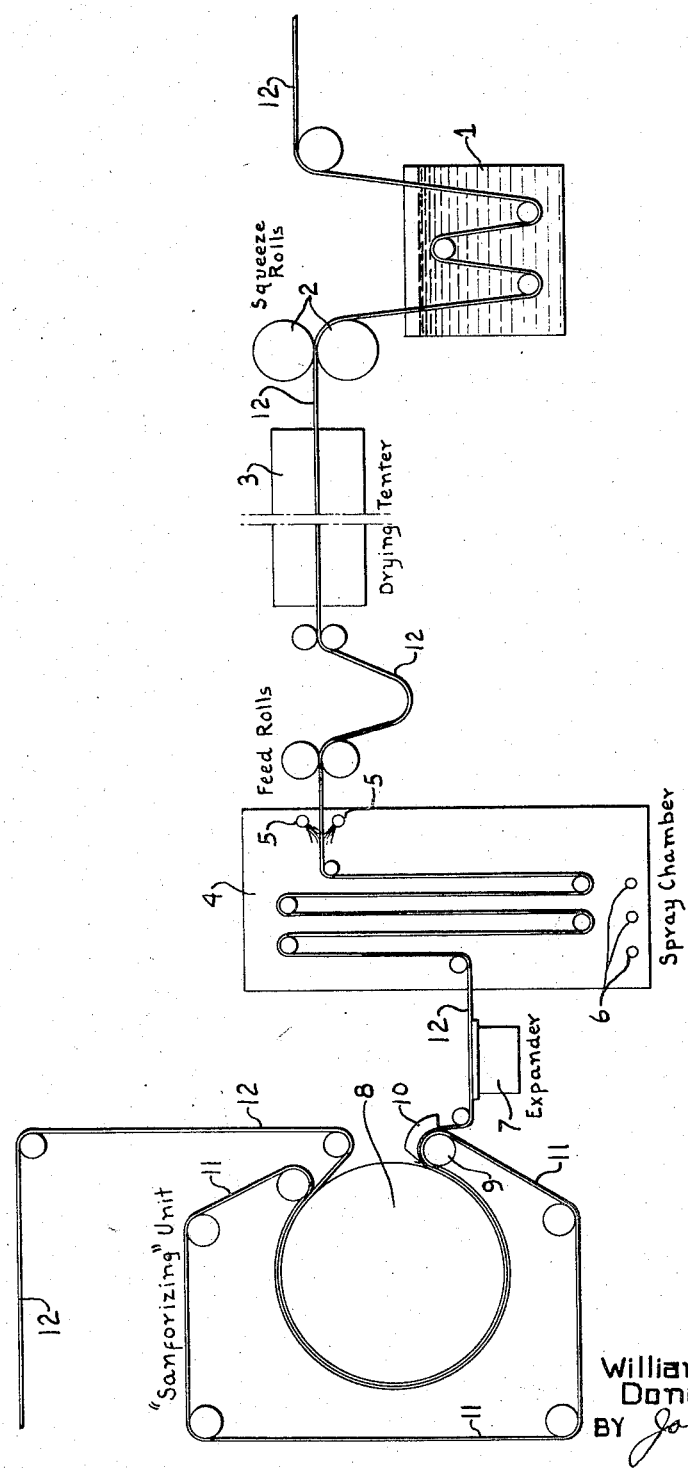

2,338,983

UNITED STATES PATENT OFFICE 2,338,983

PROCESS OF TREATING FABRICS

William J. Thackston, Haddon Heights, and Donald H. Powers, Moorestown, N. J., assignors to Röhm & Haas Company, Philadelphia, Pa., a corporation of Delaware Application May 1, 1939, Serial No. 271,002

11 Claims. (Cl. 26—18.5)

This invention relates to a process of producing stabilized non-shrinking and non-stretching fabrics by the combined action of a resin treatment and a mechanical shrinking.

It has heretofore been proposed to treat fabrics with thermosetting resins and to set the resin while the fabric is held in a stretched condition whereby the maximum yardage of a non-shrinking fabric is obtained. In such processes the resin on setting binds or cements the fibers in their stretched position so that when the tension is released they will not resume their original dimensions. To obtain this result it is necessary to use resin solutions of from 15 to 25% concentration and to fully cure the resin by heating it to approximately 300° F. for five minutes.

A second method of producing a non-shrinking fabric involves a mechanical pre-shrinking in apparatus such as is illustrated in the accompanying drawing wherein a fabric having a residual shrinking of say 10%, for instance, is fed or forced into the apparatus at a rate approximately 10% faster than it is withdrawn. In this way the stretch is taken out of the fabric so that garments subsequently made do not shrink excessively in use. While fabrics pre-shrunk in this way are a distinct improvement over the above mentioned stretched fabrics, they have the opposite disadvantage of being easily stretched during handling, finishing, or cutting. A further disadvantage is that the mill obtains a lower yield of finished yardage and any mechanical finish previously given is lost.

We have now found that both of these disadvantages can be overcome by treating the fabric prior to its being fed into the shrinking apparatus with a relatively small amount of a thermosetting resin and fusing and setting the resin as it passes through the apparatus. At the same time the differential between the rate of feed and rate of withdrawal may be reduced to a fraction of the total residual shrinkage. In this way the potential wash shrinkage is removed from the fabric and at the same time the fibers are set so that subsequent handling and use cause no substantial shrinkage or stretching of the fabric.

To further explain the invention reference will be made to the accompanying drawing which schematically illustrates apparatus for carrying out the invention. The apparatus consists essentially of a pad box 1 in which the fabric is treated with a solution of thermosetting resin, a hydraulic mangle 2 for squeezing excess resin solution, drying apparatus such as a drying tenter 3 for drying the resin treated fabric, a spray house 4 for dampening the fabric the proper degree for subsequent treatment, an expander 12, and a "Sanforizing" unit wherein the fabric is mechanically shrunk and the resin rapidly fused and set. The concentration of resin solution in pad box 1 may vary from about 2 to 10% and while any reactive resin capable of being rapidly fused and set may be used, a water-soluble urea formaldehyde condensate is preferred. The fabric 12 after being thoroughly impregnated with resin solution in the pad box passes through the squeeze rolls 2 which preferably are operated under a heavy pressure so that all solution not absorbed by the threads themselves is squeezed out of the fabric. A pressure on the rolls of from 3 to 5 tons per 40 inches of roll length is satisfactory. The fabric is then dried preferably on a tenter frame as is indicated in the drawing, care being taken to prevent any substantial curing of the resin during drying. The fabric leaving the tenter is then conveyed through suitable feed rolls to a spray chamber 4 provided with sprinklers 5 and steam inlets 6. When treating relatively thin goods the sprinklers 4 and 5 will adequately dampen the fabric but with heavier materials steam is admitted to the chamber to cause better penetration and more thorough dampening. From the spray chamber the fabric passes through an expander of any suitable type and thence to the "Sanforizing" unit.

The operation of the "Sanforizing" unit is well understood in the textile industry. Briefly stated, it consists of a main drum 8, a feed-in roll 9, a series of heated shoes 10 and a continuous blanket of felt 11. The felt blanket is passed in one direction over the feed-in roll 9, and then its curvature is reversed as it passes around the main drum 8. The surface of the blanket which is on the outside of the feed-in roll 9 and therefore in a distended or stretched condition becomes the inside surface and therefore contracted as the blanket passes around the main drum. The fabric is brought in contact with the outside surface of the blanket as it passes over the feed-in roll 9. The heated shoe 10 presses it firmly against the expanded surface of the blanket to which it adheres. As the direction of curvature is reversed the fabric is compressed and thereby mechanically shrunk. The heated shoes 10 are maintained at a temperature of from 350° to 420° F., preferably at approximately 400° F. The main drum 8 is maintained at a temperature of from 250° to 315° F. preferably at approximately 290° F. As the resin treated fabric passes under the heated shoe 10 its temperature is rapidly raised to the fusing point. The resin is hardened and set as the fabric passes around the main drum 8.

A characteristic of the fabric as thus treated is that although fully shrunk in the sense that it will not further shrink in laundering, it may be calendered and otherwise processed without excessively stretching and destroying the shrunk finish. This is of particular advantage on broadcloths and shirtings where a calender or luster finish is extremely desirable but heretofore unobtainable on shrunk fabrics.

To further illustrate the invention the processing of cotton fabrics will be described.

The cotton fabric after bleaching is passed through an aqueous resin solution containing from 2-4% of dimethylol urea. This solution may also contain a small amount of a wetting agent to aid penetration, such as 0.05% of the sodium salt of octyl phenoxy ethyl sulfate, and about 0.2% of an acidic condensing agent such as mono ammonium phosphate. The fabrics are well saturated with the solution and then squeezed tightly by passing them through a three roll hydraulic mangle having two hard rubber and one metal roll. After passing through the mangle the goods contain from 60 to 75% of their own weight of the solution, all except that actually within the yarns and fibers having been removed. The goods are then dried in the normal manner on a range consisting of eight copper cylinders heated with steam at 10-15 lbs. pressure followed by a 90 foot tenter frame operating at a temperature of from 300 to 320° F. The goods are run at a speed of 70 to 90 yards per minute and are exposed in a dry condition to this high temperature only during the last third of the tenter frame or from about 5 to 8 seconds. This is sufficient to dry the resin and hydrolyze the catalyst and thereby condition the resin for quick curing but insufficient to cause any substantial reaction taking place. The goods are then ready to be mechanically shrunk or "Sanforized."

In this process the fabrics are passed through the spray chamber 4 in which they are dampened with water then pulled to their normal width by a clip expander, expander rolls, or pin tenter frame. From the expander the goods pass under shoes 10 heated electrically to about 400° F. The blanket 11 may be a heavy wool and rubber blanket to which the fabric is struck by the heat and pressure applied by shoes 10. The main drum 8 may be a five foot metal cylinder heated by steam at a pressure of from 60 to 90 lbs. pressure. The fabric is held against the metal cylinder by the blanket and as heretofore explained is mechanically shrunk as the blanket changes its curvature in passing from feed-in roll 9 to the main drum 8.

The following table gives the results obtained on five different constructions of cotton fabrics when treated as above described. Pieces of each fabric were mechanically shrunk both with and without the resin treatment. The table gives the construction of the cotton fabrics, the percent shrinkage removed in a regular run, i. e. without resin treatment, the percent shrinkage removed when resin was used, the percent gain in yardage thereby obtained and the percent decrease in potential shrinkage. In all cases the goods were shrunk to zero shrinkage. The resin treated fabrics also had a zero stretch.

| Construction of fabrics | Shrinkage removed in regular run | Shrinkage removed in resin run | Gain in yardage | Decrease in shrinkage |
|---|---|---|---|---|
| | Per cent | Per cent | Per cent | Per cent |
| 68 x 72, 4.65 yd | 4.58 | 1.81 | 2.77 | 60.5 |
| 80 x 80, 4.00 yd | 5.69 | 2.39 | 3.30 | 58.0 |
| 100 x 60, 4.15 yd | 7.50 | 2.64 | 4.86 | 64.8 |
| 112 x 60, 4.10 yd | 6.67 | 2.56 | 4.11 | 61.6 |
| 136 x 60, 4.00 yd | 7.78 | 2.53 | 5.25 | 67.5 |

Analysis of the resin treated fabrics showed the presence in each fabric of from 2.5-3.0% resin. Additional analyses after thorough washing showed that the washing removed only 0.2 to 0.3% of reaction products and uncured resin. Subsequent washing of the fabric is therefore unnecessary.

The invention was applied to a suiting made of approximately 85% viscose spun rayon and 15% cellulose acetate rayon. Fabrics of this type cannot be satisfactorily preshrunk by mechanical means because they possess a large potential wash shrinkage and because the smooth fibers readily slip over one another and therefore fail to hold a given position. In treating this fabric an 8-10% aqueous solution of dimethylol urea containing a small amount of dimethyl benzyl cetyl ammonium chloride and 0.6% mono-ammonium phosphate was used. The drying frame was operated at a speed of 40 yards per minute to take care of the heavier fabric but otherwise the treatment was the same as above described with reference to the cotton fabrics.

| Construction | Potential wash shrinkage | Yardage removed in resin run | Gain in yardage | Decrease in shrinkage |
|---|---|---|---|---|
| 40", 56 x 44, 2.17 yd. spun rayon and acetate suiting | Per cent 16.2 | Per cent 7.8 | Per cent 8.4 | Per cent 51.8 |

Analysis of the resin treated fabric showed the presence of about 6% resin in the fabric.

In the usual processes of treating fabrics with resins to impart crease resistance, a non-slip finish or to prevent shrinkage from 15 to 25% resin is absorbed by the fabric. This amount of resin produces a stiffening and harsh handle to the fabric which must be overcome by means of softening agents and plasticizers. In the process herein described from 1 to 6% resin is left in the goods, which amount has little noticeable effect on flexibility, appearance, or feel of the goods.

For the purpose of describing the invention cellulosic fabrics and urea formaldehyde resins were used in the foregoing illustrations. The invention may also be applied to many other fabrics such as various synthetic fabrics, wool, linen, silk, etc. Any other soluble thermosetting resin may be used in place of the urea-formaldehyde resin, such as other carbamide-formaldehyde resins, phenol-formaldehyde resin, and the resins made by condensing formaldehyde with guanidine, dicyandiamide, or the amino triazines such as ammeline, thio ammeline, melamine, etc.

We claim:

1. Process of treating fabrics which comprises depositing within the yarns and fibers thereof from 1 to 6% by weight of a thermosetting resin, heat pressing said fabric in a dampened condition to the distended side of a heavy blanket passing over a roll, passing said blanket and adherent fabric around a heated drum revolving in an opposite direction to said roll, and separating said fabric from said blanket.

2. Process of treating fabrics which comprises depositing within the yarns and fibers thereof from 1 to 6% by weight of a water-soluble urea formaldehyde intermediate condensate, heat pressing said fabric in a dampened condition to the distended side of a heavy blanket passing over a roll, passing said blanket and adherent fabric around a heated drum revolving in an opposite direction to said roll, separating said fabric from said blanket.

3. Process of treating fabrics which comprises depositing within the yarns and fibers thereof from 1 to 6% by weight of a thermosetting resin, passing said fabric in a dampened condition at a temperature of from 350–420° F. to the distended side of a heavy blanket passing over a roll, passing said blanket and adherent fabric around a drum revolving in an opposite direction to said roll and heated to from 250–315° F., and separating said fabric from said blanket.

4. Process of treating cotton fabrics which comprises depositing within the yarns and fibers thereof from 1 to 6% by weight of a water-soluble intermediate urea formaldehyde condensation product, pressing said fabric in a dampened condition at a temperature of from 350–420° F. to the distended side of a heavy blanket passing over a roll, passing said blanket and adherent fabric around a drum revolving in an opposite direction to said roll and heated to from 250–315° F., and separating said fabric from said blanket.

5. Process of treating fabrics which comprises passing said fabric through an aqueous solution containing from 2 to 10% of a thermosetting resin, squeezing said fabric to expel the solution between the yarns and fibers thereof, drying said fabric under conditions which do not set the resin, dampening said fabric and heat pressing it to the distended side of a heavy blanket passing over a roll, passing said blanket and adherent fabric around a heated drum revolving in an opposite direction to said roll, and separating said fabric from said blanket.

6. Process of permanently shrinking cotton fabrics which comprises passing said fabric through a solution containing from 2 to 4% dimethylol urea, squeezing said fabric in a hydraulic mangle operating under a pressure of from 3 to 5 tons per 40 inches of roll length, drying said fabric in a tenter under conditions which do not set the resin, dampening said fabric, pressing said fabric at a temperature of from 350–420° F. to the distended side of a heavy blanket passing over a roll, curing the resin in said fabric by passing said blanket and adherent fabric around a drum revolving in an opposite direction to said roll and heated to from 250–315° F., and separating said fabric from said blanket.

7. In the process of mechanically shrinking fabrics by heat pressing the fabric in a dampened condition to the distended side of a heavy blanket passing over a roll and then passing the blanket and adherent fabric around a heated drum revolving in an opposite direction to said roll, the improvement which comprises depositing within the yarns and fibers of said fabric from 1 to 6% by weight of a thermosetting resin, fusing said resin as the fabric is pressed to the distended side of said blanket, and curing said resin as the fabric passes around the heated drum.

8. In the process of mechanically shrinking fabrics by heat pressing the fabric in a dampened condition to the distended side of a heavy blanket passing over a roll and then passing the blanket and adherent fabric around a heated drum revolving in an opposite direction to said roll, the improvement which comprises depositing within the yarns and fibers of said fabric from 1 to 6% by weight of a water-soluble urea formaldehyde intermediate condensate, fusing said resin as the fabric is pressed to the distended side of said blanket, and curing said resin as the fabric passes around the heated drum.

9. Method of reducing shrinkage of textile fabrics which comprises impregnating the fabric with a solution, one of the ingredients of which is formaldehyde, squeezing the fabric to expel some of the solution, tentering and drying the fabric to a desired dimension under conditions insufficient to set the impregnate, and thereafter subjecting the fabric to mechanical shrinking of the "Sanforizing" type comprising moistening the fabric prior to its entrance into the yarn compacting part of the mechanical shrinkage machine, and heating the fabric at high temperature during the yarn compacting to fuse the impregnate, if necessary, and at lower temperature to set the impregnate after passage thereof through the yarn compacting part of said machine.

10. Method of reducing shrinkage of textile fabrics which comprises impregnating the fabric with a solution of ingredients which form a synthetic thermosetting resin when substantial heat is applied thereto, squeezing the fabric to expel some of the solution, tentering and drying the fabric to a desired dimension under conditions insufficient to set the impregnate, and thereafter subjecting the fabric to mechanical shrinking of the "Sanforizing" type comprising moistening the fabric prior to its entrance into the yarn compacting part of the mechanical shrinkage machine, and heating the fabric at high temperature during the yarn compacting to fuse the impregnate, if necessary, and at lower temperature to set the impregnate after passage thereof through the yarn compacting part of said machine.

11. Method of reducing shrinkage of textile fabrics which comprises impregnating the fabric with a solution of ingredients which form a urea-formaldehyde resin when substantial heat is applied thereto, squeezing the fabric to expel some of the solution, tentering and drying the fabric to a desired dimension under conditions insufficient to set the impregnate, and thereafter subjecting the fabric to mechanical shrinking of the "Sanforizing" type comprising moistening the fabric prior to its entrance into the yarn compacting part of the mechanical shrinkage machine, and heating the fabric at high temperature during the yarn compacting to fuse the impregnate, if necessary, and at lower temperature to set the impregnate after passage thereof through the yarn compacting part of said machine.

WILLIAM J. THACKSTON.
DONALD H. POWERS.

CERTIFICATE OF CORRECTION.

Patent No. 2,338,983. January 11, 1944.

WILLIAM J. THACKSTON, ET AL.

It is hereby certified that error appears in the printed specification of the above numbered patent requiring correction as follows: Page 2, first column, line 42, for "struck" read --stuck--; and that the said Letters Patent should be read with this correction therein that the same may conform to the record of the case in the Patent Office.

Signed and sealed this 11th day of April, A. D. 1944.

Leslie Frazer (Seal) Acting Commissioner of Patents.